US008681733B2

(12) United States Patent
Chun et al.

(10) Patent No.: US 8,681,733 B2
(45) Date of Patent: Mar. 25, 2014

(54) COMMUNICATING CONTROL INFORMATION IN MOBILE COMMUNICATION SYSTEM

(75) Inventors: Sung Duck Chun, Anyang (KR); Young Dae Lee, HaNam (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 13/153,279

(22) Filed: Jun. 3, 2011

(65) Prior Publication Data

US 2011/0235611 A1 Sep. 29, 2011

Related U.S. Application Data

(63) Continuation of application No. 12/719,784, filed on Mar. 8, 2010, now Pat. No. 7,978,679, which is a continuation of application No. 11/416,530, filed on May 2, 2006, now Pat. No. 7,715,360.

(30) Foreign Application Priority Data

May 3, 2005 (KR) ........................ 10-2005-0037307

(51) Int. Cl.
 *H04W 4/00* (2009.01)
(52) U.S. Cl.
 USPC ........................... 370/330; 370/337; 370/338
(58) Field of Classification Search
 USPC ........................................ 370/330, 337, 338
 See application file for complete search history.

(56) References Cited

U.S. PATENT DOCUMENTS

| 7,376,879 B2 | 5/2008 | Terry et al. |
| 2003/0123470 A1 | 7/2003 | Kim et al. |
| 2005/0084267 A1 | 4/2005 | Fan et al. |
| 2005/0249118 A1 | 11/2005 | Terry et al. |
| 2005/0265301 A1 | 12/2005 | Heo et al. |

FOREIGN PATENT DOCUMENTS

| EP | 1257140 | 11/2002 |
| EP | 1289328 | 3/2003 |
| EP | 1511245 | 3/2005 |
| JP | 2001-103551 | 4/2001 |
| JP | 2004080165 | 3/2004 |
| JP | 2005073276 | 3/2005 |
| RU | 2251219 | 4/2005 |
| TW | 507434 | 10/2002 |
| TW | I230556 | 4/2005 |
| WO | 03-039085 | 5/2003 |
| WO | 03/096617 | 11/2003 |
| WO | 2005/078967 | 8/2005 |

OTHER PUBLICATIONS

Taiwan Intellectual Property Office Application Serial No. 095115789, Office Action dated Feb. 25, 2013, 7 pages.

(Continued)

*Primary Examiner* — Marisol Figueroa
(74) *Attorney, Agent, or Firm* — Lee, Hong, Degerman, Kang & Waimey

(57) ABSTRACT

The present invention relates to communicating control information in a mobile communication system, by which new control information can be transmitted more quickly. The present invention comprises transmitting a first data block comprising control information for transmitting first data when no resources for the transmission of the first data are available, receiving second data from an upper layer to be transmitted, wherein the second data has a higher priority than the first data, and transmitting a second data block comprising updated control information for transmitting the first and second data when no resources for the transmission of the first and second data are available.

16 Claims, 9 Drawing Sheets

(56) References Cited

OTHER PUBLICATIONS

K. Yamaoka et al., "The condition of improving throughput both of high and low priority at the same time," IEEE Pacific Rim Conference on Communications, Computers and Signal Processing, vol. 2, pp. 611-614, Aug. 2001.

LG Electronics Inc., "MAC-e PDU Format for Control Information," 3GPP TSG-RAN WG2 Meeting #45bis, R2-050076, XP-002583398, Jan. 10, 2005.

Samsung, "HARQ Profile for MAC-e Control Signaling (Rate Request)," 3GPP TSG-RAN WG2 Meeting #45bis, Tdoc R2-050028, XP-050127318, Jan. 10, 2005.

3rd Generation Partnership Project (3GPP), "Universal Mobile Telecommunications System (UMTS); Medium Access Control (MAC) protocol specification (3GPP TS 25.321 version 6.3.0 Release 6)", ETSI TS 125 321, Dec. 2004.

Qualcomm, et al., "Rate-request proposal," 3GPP TSG-RAN WG2 Meeting #45bis, R2-050179, XP050127456, Jan. 2005, 8 pages.

European Patent Office Application Serial No. 11001177.2, Search Report dated Jun. 11, 2013, 8 pages.

COMMUNICATING CONTROL INFORMATION IN MOBILE COMMUNICATION SYSTEM

CROSS-REFERENCE TO RELATED APPLICATIONS

This application is a continuation of U.S. application Ser. No. 12/719,784, filed on Mar. 8, 2010, now U.S. Pat. No. 7,978,679, which is a continuation of U.S. application Ser. No. 11/416,530, filed on May 2, 2006, now U.S. Pat. No. 7,715,360, which pursuant to 35 U.S.C. §119(a), claims the benefit of earlier filing date and right of priority to Korean Application No. P2005-0037307, filed on May 3, 2005, the contents of which are hereby incorporated by reference herein in their entireties.

FIELD OF THE INVENTION

The present invention relates to communicating control information in a mobile communication system. Although the present invention is suitable for a wide scope of applications, it is particularly suitable for quickly communicating new control information in a mobile communication system using an automatic repeat request scheme for indicating reception-failure of a packet.

BACKGROUND OF THE INVENTION

FIG. 1 is a block diagram of a network structure of a universal mobile telecommunications system (UMTS). Referring to FIG. 1, a UMTS mainly includes a user equipment (UE), a UMTS terrestrial radio access network (UTRAN), and a core network (CN).

The UTRAN includes at least one radio network sub-system (hereinafter abbreviated RNS). The RNS includes one radio network controller (RNC) and at least one base station (Node B) managed by the RNC. At least one or more cells exist in one Node B.

FIG. 2 is an architectural diagram of a radio interface protocol between the UE (user equipment) and the UTRAN (UMTS terrestrial radio access network). Referring to FIG. 2, a radio interface protocol vertically includes a physical layer, a data link layer, and a network layer. Horizontally, the radio interface protocol includes a user plane for data information transfer and a control plane for signaling transfer.

The protocol layers in FIG. 2 can be divided into a first layer (L1), a second layer (L2), and a third layer (L3) such as the three lower layers of an open system interconnection (OSI) standard model widely known in the art. The respective layers in FIG. 2 are explained as follows.

A physical layer (PHY) is the first layer and offers an information transfer service to an upper layer using a physical channel. The physical layer (PHY) is connected to a medium access control (MAC) layer located above the physical layer PHY via a transport channel. Data is transferred between the MAC layer and the PHY layer via the transport channel. Moreover, data is transferred between different physical layers, and more particularly, between a physical layer of a transmitting side and a physical layer of a receiving side via the physical channel.

The MAC layer of the second layer offers a service to a radio link control (RLC) layer located above the MAC layer via a logical channel. The MAC layer can also be divided into a MAC-b sublayer, a MAC-d sublayer, a MAC-c/sh sublayer, a MAC-hs sublayer and a MAC-e sublayer according to the types of transport channels managed in detail.

The MAC-b sublayer takes charge of managing a transport channel such as a broadcast channel (BCH) responsible for broadcasting system information. The MAC-c/sh sublayer manages a shared transport channel, which is shared by other UEs. A forward access channel (FACH) and a downlink shared channel (DSCH) are examples of a shared transport channel. The MAC-d sublayer takes charge of managing a dedicated transport channel such as a DCH (dedicated channel) for a specific UE. The MAC-hs sublayer manages a transport channel such as a high speed downlink shared channel (HS-DSCH) for supporting high speed data transfer in downlink and uplink. The MAC-e sublayer manages a transport channel such as an enhanced dedicated channel (E-DCH) for uplink data transfer.

FIG. 3 is a diagram of a structural example of DCH and E-DCH. Referring to FIG. 3, both DCH and E-DCH are transport channels that can be dedicatedly used by one user equipment (UE). In particular, the E-DCH is used by a user equipment to transfer data to a UTRAN in uplink. Compared to the DCH, the E-DCH can transfer uplink data faster than the DCH. To transfer data at high speed, the E-DCH adopts a technique such as hybrid automatic repeat request (HARQ), adaptive modulation and coding (AMC) and scheduling controlled by a Node B, for example.

For E-DCH, the Node B transfers to the UE downlink control information for controlling the UE's E-DCH transfer. The downlink control information includes response information (ACK/NACK) for HARQ, channel quality information for AMC, E-DCH transport rate assignment information, E-DCH transport start time and transport time interval assignment information, and transport block size information, for example. Meanwhile, the UE transfers uplink control information to the Node B. The uplink control information includes E-DCH rate request information for Node B controlled scheduling, UE buffer status information, and UE power status information, for example. The uplink and downlink control information for E-DCH is transferred via a physical control channel such as an enhanced dedicated physical control channel (E-DPCCH).

A MAC-d flow is defined between a MAC-d sublayer and a MAC-e sublayer for E-DCH. In this case, a dedicated logical channel is mapped to the MAC-d flow. The MAC-d flow is mapped to a transport channel E-DCH, and the E-DCH is mapped to another physical channel E-DPDCH (enhanced dedicated physical data channel). On the other hand, the dedicated logical channel can be directly mapped to DCH. In this case, the transport channel DCH is mapped to a dedicated physical data channel (DPDCH). The MAC-d sublayer in FIG. 3 manages the DCH (dedicated channel) as a dedicated transport channel for a specific user equipment, while the MAC-e sublayer manages the E-DCH (enhanced dedicated channel) as a transport channel used in transferring fast data in uplink.

A MAC-d sublayer of a transmitting side configures a MAC-d protocol data unit (PDU) from a MAC-d service data unit (SDU) delivered from an upper layer, i.e., an RLC layer. A MAC-d sublayer of a receiving side facilitates recovery of the MAC-d SDU from the MAC-d PDU received from a lower layer and delivers the recovered MAC-d SDU to an upper layer. In doing so, the MAC-d exchanges the MAC-d PDU with a MAC-e sublayer via a MAC-d flow or exchanges the MAC-d PDU with a physical layer via the DCH. The MAC-d sublayer of the receiving side recovers the MAC-d PDU using a MAC-d header attached to the MAC-d PDU prior to delivering the recovered MAC-d SDU to an upper layer.

A MAC-e sublayer of a transmitting side configures a MAC-e PDU from a MAC-e SDU corresponding to a MAC-d PDU delivered from an upper layer, i.e., a MAC-d sublayer. The MAC-e sublayer of a receiving side facilitates recovery of the MAC-e SDU from the MAC-e PDU received from a lower layer, i.e., a physical layer and delivers the recovered MAC-e SDU to a higher layer. In doing so, the MAC-e exchanges the MAC-e PDU with the physical layer via the E-DCH. The MAC-e sublayer of the receiving side recovers the MAC-e SDU using a MAC-e header attached to the MAC-e PDU prior to delivering the recovered MAC-e SDU to a higher layer.

FIG. 4 is a diagram of a protocol for E-DCH. Referring to FIG. 4, a MAC-e sublayer supporting E-DCH exists below a MAC-d sublayer of a UTRAN. Furthermore, a MAC-e sublayer supporting E-DCH exists below a MAC-d sublayer of a UE. The MAC-e sublayer of the UTRAN is located at a Node B. The MAC-e sublayer exists in each UE. On the other hand, the MAC-d sublayer of the UTRAN is located at a serving radio network controller (SRNC) in charge of managing a corresponding UE. The MAC-d sublayer exists in each UE.

Control information transmission for E-DCH is explained as follows. First of all, a scheduler exists at a Node B for E-DCH. The scheduler facilitates the allocation of an optimal radio resource to each UE existing within one cell to raise transmission efficiency of data in an uplink transfer at a base station from all UEs within each cell. In particular, more radio resources are allocated to a UE having a good channel status in one cell to enable the corresponding UE to transmit more data. Less radio resources are allocated to a UE having a poor channel status to prevent the corresponding UE from transmitting interference signals over an uplink radio channel.

When allocating radio resources to the corresponding UE, the scheduler does not only consider a radio channel status of a UE. The scheduler also requires control information from UEs. For example, the control information includes a power quantity the UE can use for E-DCH or a quantity of data the UE attempts to transmit. Namely, even if the UE has a better channel status, if there is no spare power the UE can use for E-DCH, or if there is no data the UE will transmit in an uplink direction, a radio resource should not be allocated to the UE. In other words, the scheduler can raise the efficiency of radio resource use within one cell only if a radio resource is allocated to a UE having a spare power for E-DCH and data to be transmitted in the uplink transfer.

Accordingly, a UE should send control information to a scheduler of a Node B. The control information can be transmitted in various ways. For instance, a scheduler of a Node B can instruct a UE to report that data to be transmitted in uplink exceeds a specific value or to periodically send control information to the Node B itself.

In case a radio resource is allocated to a UE from a scheduler of a Node B, the UE configures a MAC-e PDU within the allocated radio resource and then transmits the MAC-e PDU to a base station via E-DCH. In particular, if there exists data to be transmitted, a UE sends control information to a Node B to inform the Node-b that there is data to be transmitted by the UE. A scheduler of the Node B then sends information indicating that a radio resource allocation will be made to the UE based on the control information been sent by the UE. In this case, the information indicating the radio resource allocation means a maximum value of power the UE can transmit in uplink, a ratio for a reference channel, etc. The UE configures the MAC-e PDU within a permitted range based on the information indicating the radio resource allocation and transmits the configured MAC-e PDU.

However, in the related art method, a UE transmits a MAC-e PDU, which starts a transmission, until receiving an acknowledgement (ACK) from the Node B that the MAC-e PDU was correctly received by the Node B, or retransmits the MAC-e PDU as many times as a maximum retransmission attempt value allows. Accordingly, when new data arrives at the UE to be transmitted to the Node B, new control information should also be transmitted to the Node B to request a resource allocation for the new data transmission. However, in the related art as shown in FIG. 5, the UE must wait until receiving an ACK from the Node B or retransmit an old MAC-e PDU a maximum number of times allowable before transmitting a new or updated MAC-e PDU with the new control information. Accordingly, a time taken for a UE to receive a radio resource allocation is delayed. Furthermore, by considering that information such as power information is frequently changed, wrong or old information is delivered to a Node B under the related art method.

SUMMARY OF THE INVENTION

The present invention is directed to communicating control information in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating control information in a mobile communication system, the method comprising transmitting a first data block comprising control information for transmitting first data when no resources for the transmission of the first data are available, receiving second data from an upper layer to be transmitted, wherein the second data has a higher priority than the first data, and transmitting a second data block comprising updated control information for transmitting the first and second data when no resources for the transmission of the first and second data are available. Preferably, priority is related to a logical channel through which data is delivered.

In one aspect of the invention the method further comprises establishing an automatic repeat request scheme with a receiver for receiving feedback information regarding the transmission of the first and second data block, wherein the receiver is one of a mobile terminal and a network.

Preferably, the second data block is transmitted independent of receiving feedback information from the receiver for the first data block transmission.

Preferably, the first data block is retransmitted to the receiver using the automatic repeat request scheme until receiving ACK for the first data block from the receiver, wherein the receiver is one of a mobile terminal and a network.

Preferably, the first data block is retransmitted to the receiver a maximum number of times set by the receiver using the automatic repeat request scheme if ACK for the first data block is not received from the receiver, wherein the receiver is one of a mobile terminal and a network.

Preferably, the second data block is retransmitted to the receiver using the automatic repeat request scheme until receiving ACK for the second data block from the receiver, wherein the receiver is one of a mobile terminal and a network.

Preferably, the second data block is retransmitted to the receiver a maximum number of times set by the receiver using the automatic repeat request scheme if ACK for the second data block is not received from the receiver, wherein the receiver is one of a mobile terminal and a network.

In another aspect of the invention, the control information comprises scheduling information, wherein the scheduling information comprises at least one of highest priority logical channel identifier, total E-DCH buffer status, highest priority logical channel buffer status, and mobile terminal power headroom.

In a further aspect of the invention, the first data block is a MAC-e PDU and the second data block is a MAC-e PDU.

In accordance with another embodiment of the present invention, a mobile terminal for communicating control information in a mobile communication system comprises a processor for receiving first and second data from an upper layer and generating a first data and second data block to be transmitted, wherein the second data has a higher priority than the first data, and a transmitter controlled by the processor for transmitting the first data block comprising control information for transmitting the first data when no resources for the transmission of the first data are available, wherein the transmitter transmits the second data block comprising updated control information for transmitting the first and second data when no resources for the transmission of the first and second data are available.

Preferably, priority is related to a logical channel through which data is delivered.

In one aspect of the invention, the mobile terminal establishes an automatic repeat request scheme with a receiving side for receiving feedback information regarding the transmission of the first and second data block, wherein the receiving side is one of a mobile terminal and a network.

Preferably, the second data block is transmitted independent of receiving feedback information from the receiving side for the first data block transmission.

Preferably, the first data block is retransmitted to the receiving side using the automatic repeat request scheme until receiving ACK for the first data block from the receiving side, wherein the receiving side is one of a mobile terminal and a network.

Preferably, the first data block is retransmitted to the receiving side a maximum number of times set by the receiving side using the automatic repeat request scheme if ACK for the first data block is not received from the receiving side, wherein the receiving side is one of a mobile terminal and a network.

Preferably, the second data block is retransmitted to the receiving side using the automatic repeat request scheme until receiving ACK for the second data block from the receiving side, wherein the receiving side is one of a mobile terminal and a network.

Preferably, the second data block is retransmitted to the receiving side a maximum number of times set by the receiving side using the automatic repeat request scheme if ACK for the second data block is not received from the receiving side, wherein the receiving side is one of a mobile terminal and a network.

In another aspect of the invention, the control information comprises scheduling information, wherein the scheduling information comprises at least one of highest priority logical channel identifier, total E-DCH buffer status, highest priority logical channel buffer status, and mobile terminal power headroom.

In a further aspect of the invention, the first data block is a MAC-e PDU and the second data block is a MAC-e PDU.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
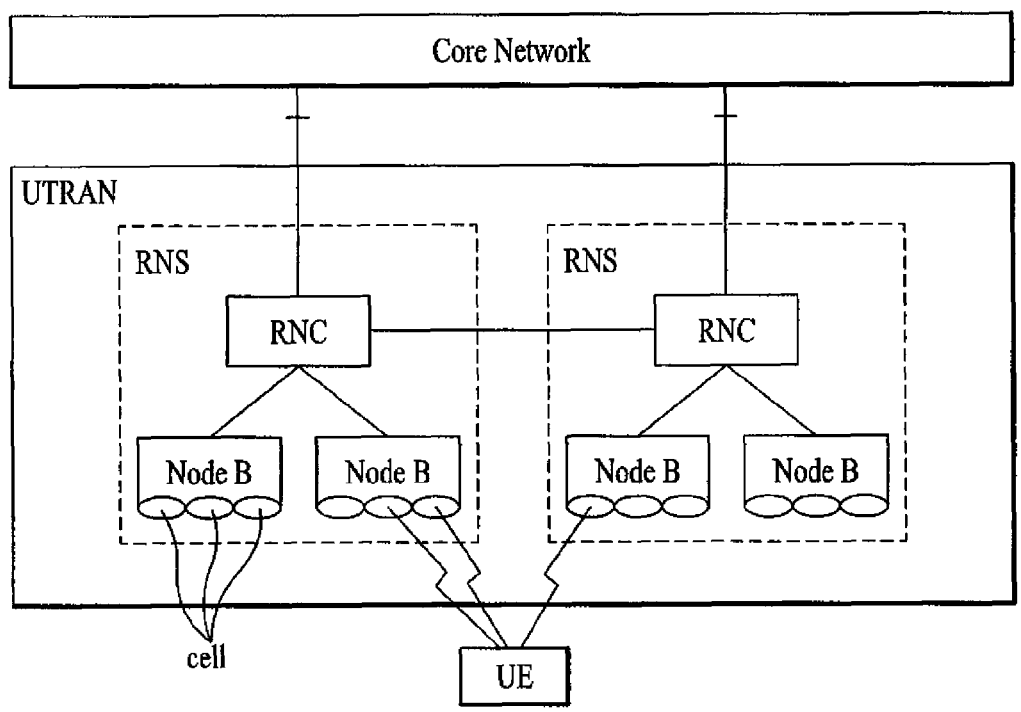
FIG. 1 is a block diagram of a network structure of a universal mobile telecommunications system (UMTS).
Figure 2:
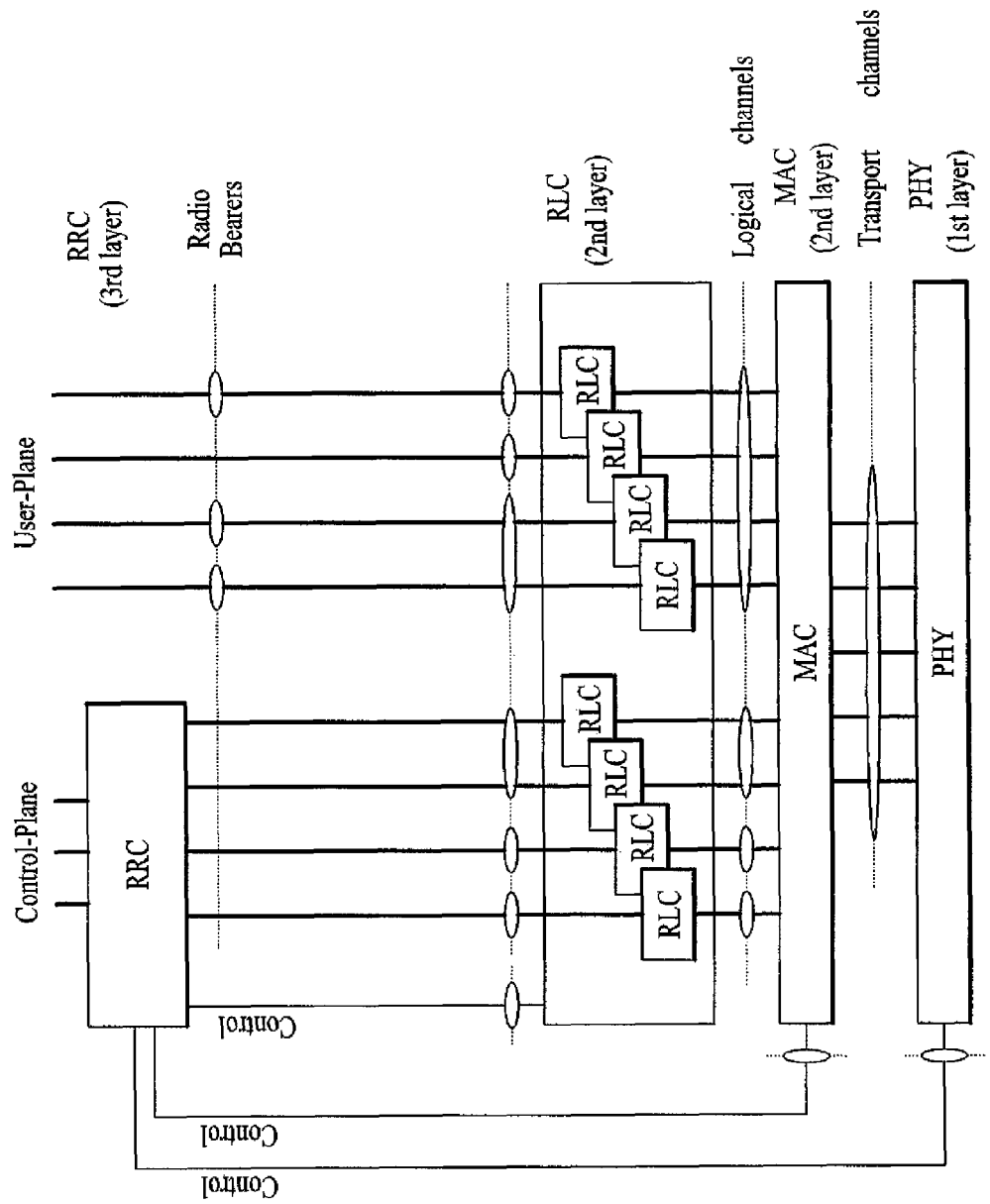
FIG. 2 is an architectural diagram of a radio interface protocol between a user equipment (UE) and a UMTS terrestrial radio access network (UTRAN).
Figure 3:
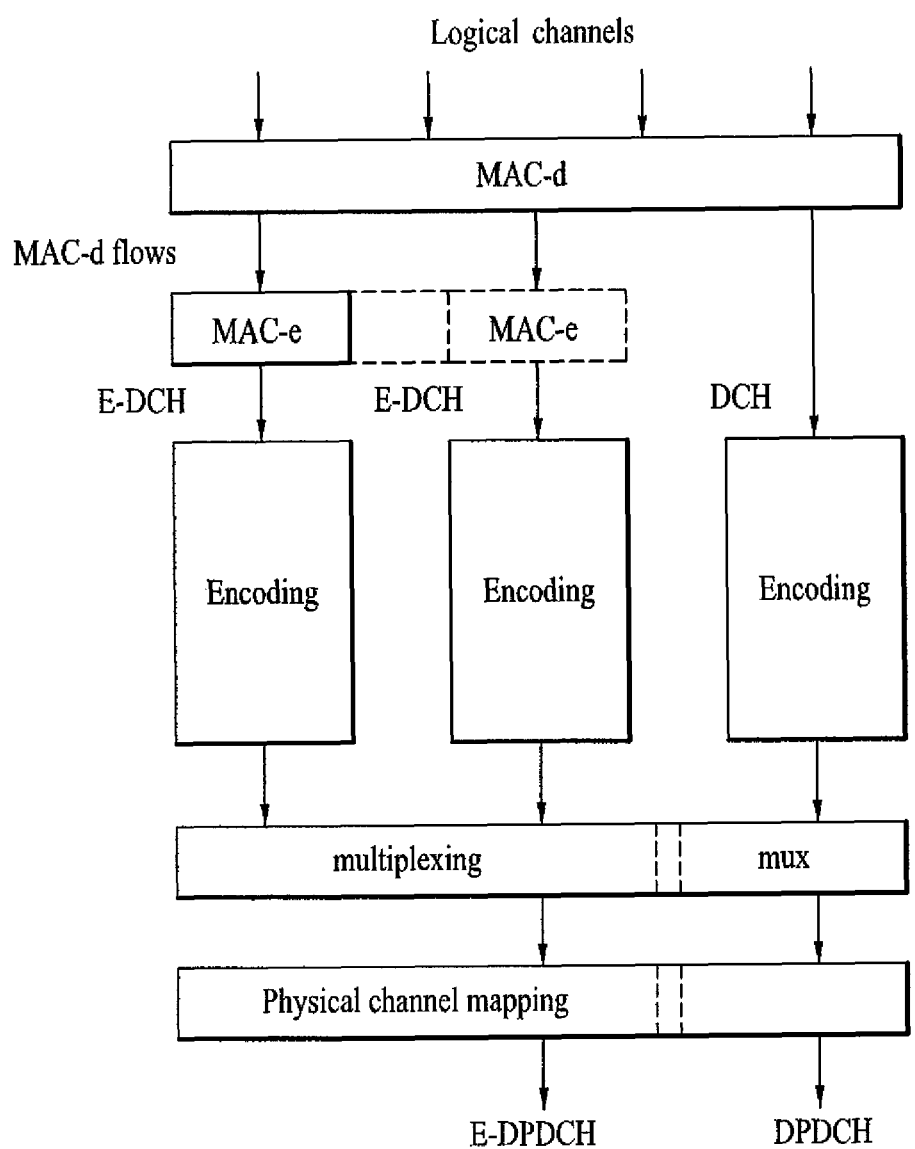
FIG. 3 is a diagram of a structural example of a dedicated channel (DCH) and an enhanced dedicated channel (E-DCH).
Figure 4:
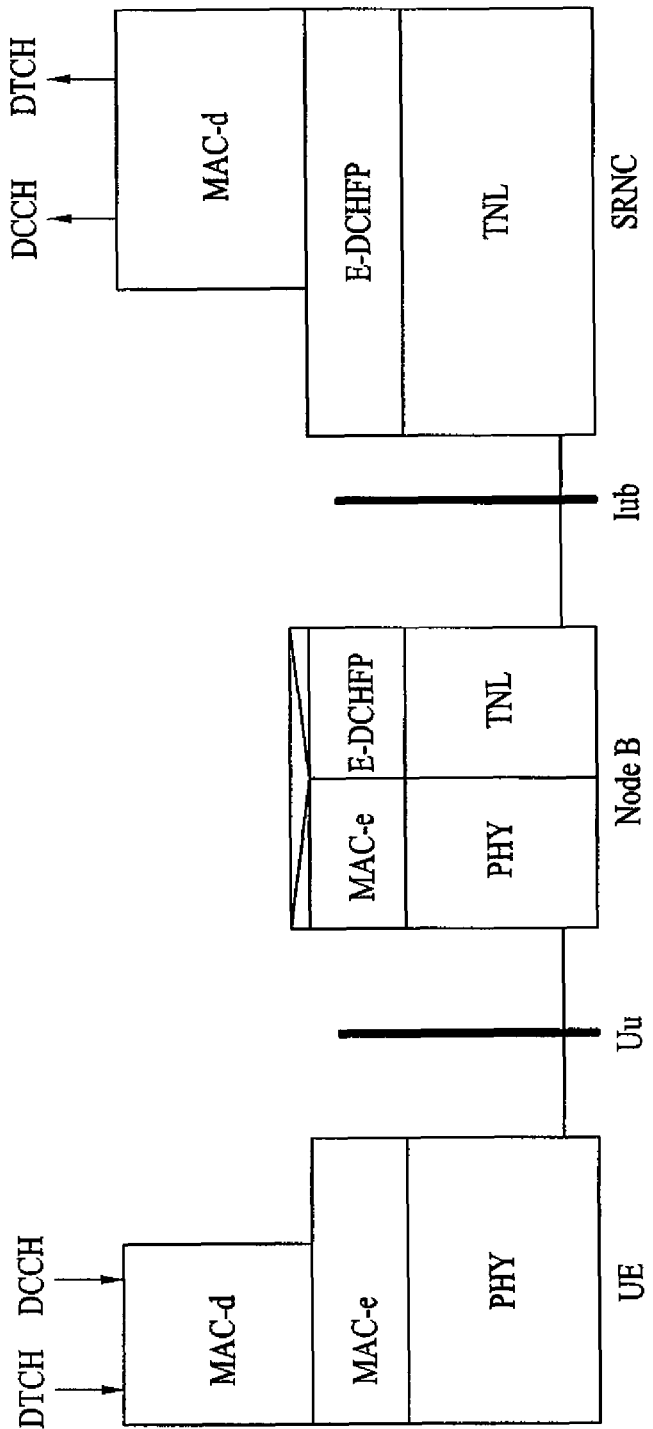
FIG. 4 is a diagram of a protocol for E-DCH.
Figure 5:
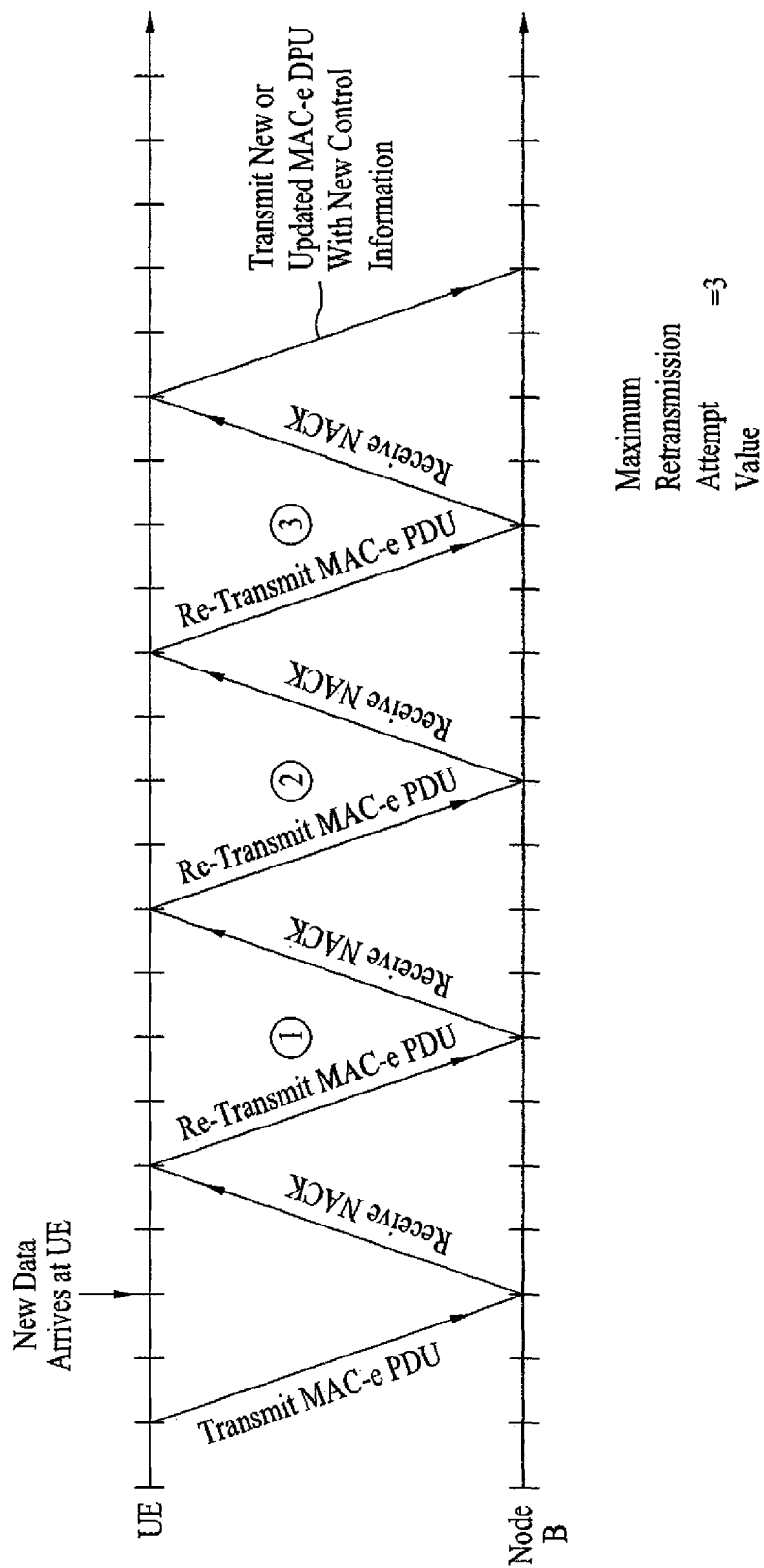
FIG. 5 illustrates a method of communicating control information in a mobile communication system in accordance with the related art.

The present invention relates to communicating control information in a mobile communication system.

Reference will now be made in detail to the preferred embodiments of the present invention, examples of which are illustrated in the accompanying drawings. Wherever possible, the same reference numbers will be used throughout the drawings to refer to the same or like parts.

A transmission method using a hybrid automatic repeat request (HARQ) scheme will be explained as follows. First of all, HARQ is used for E-DCH to raise a probability of transmitted data successfully arriving at a receiving side and to reduce the power necessary for the corresponding arrival. Accordingly, under HARQ, raising the probability of transmission success and reducing necessary power is dependent on feedback information sent from the receiving side to a transmitting side. Preferably, the feedback information notifies the transmitting side whether the data transmitted by the transmitting side is correctly received at the receiving side.

For instance, if a receiving side correctly receives a packet 1 transmitted by a transmitting side, such as a UE, via a physical channel, the receiving side transmits a reception success signal or acknowledgement (ACK). If the receiving side fails to correctly receive the packet 1, the receiving side transmits a negative acknowledgement (NACK). Thereafter, the transmitting side transmits new data, i.e., a packet 2 in case that the feedback is ACK with reference to the feedback having been transmitted by the transmitting side. If the feedback is NACK, the transmitting side retransmits the packet 1. In doing so, the transmitting side attempts a transmission using both of the former packet 1 (firstly transmitted) and the latter packet 1 (secondly transmitted). If this succeeds, the receiving side transmits ACK to the transmitting side. If this fails, the receiving side transmits NACK to the transmitting side. When NACK is received by the transmitting side, the transmitting side repeats the above process. In this case, the retransmitted packet 1 should be identical to the former packet 1. If not, the receiving side is unable to recover the data correctly.

However, if the UE continues to stay in an area having a poor channel status or if data to be transmitted by the UE is sensitive to delivery delay, the UE is unable to indefinitely perform the above-explained retransmission. Therefore, the receiving side informs a UE of a maximum number of available transmissions or retransmissions. In case of receiving the NACK from the receiving side after having attempted to transmit data as many times as the maximum number of retransmissions, the UE stops attempting the transmission of the corresponding data and attempts a transmission of next data.

Hence, even if control information is included in the MAC-e PDU, the UE attempts retransmission of the MAC-e PDU as many times as the maximum number of retransmissions. As previously mentioned, the above-explained retransmission is needed to raise the probability of reception success of the MAC-e PDU in the receiving side. Preferably, contents included in the control information are a maximum priority channel, a maximum priority channel ratio, a total buffer quantity, a margin of power and the like. In this case, the maximum priority channel means a channel having a highest priority among channels having data to be transmitted.

As mentioned in the foregoing description, in the HARQ system, a transmitting side transmits data, waits for a feedback from a receiving side and then decides whether to perform a retransmission according to the contents of the feedback. However, a long time elapses until a response from the receiving side arrives at the transmitting side after the data is transmitted by the transmitting side. While awaiting the response, the UE may receive various new data from a user. In such a case, the maximum priority channel may be changed, or other information such as the total buffer quantity, the margin of power and the like may be changed as well.

In particular, the maximum priority channel information is important. This is because a Node B preferentially allocates radio resources to UEs having higher priorities when considering all UEs within a corresponding cell during the allocation of radio resources. Accordingly, if a maximum priority channel included in the control information firstly transmitted by a UE is a channel having a very low priority, and if data later arrives at the UE from a channel having a higher priority, the UE should inform the Node B of this information immediately. For example, the UE may inform the Node B at a time when the UE receives NACK from the Node B.

Figure 6A:
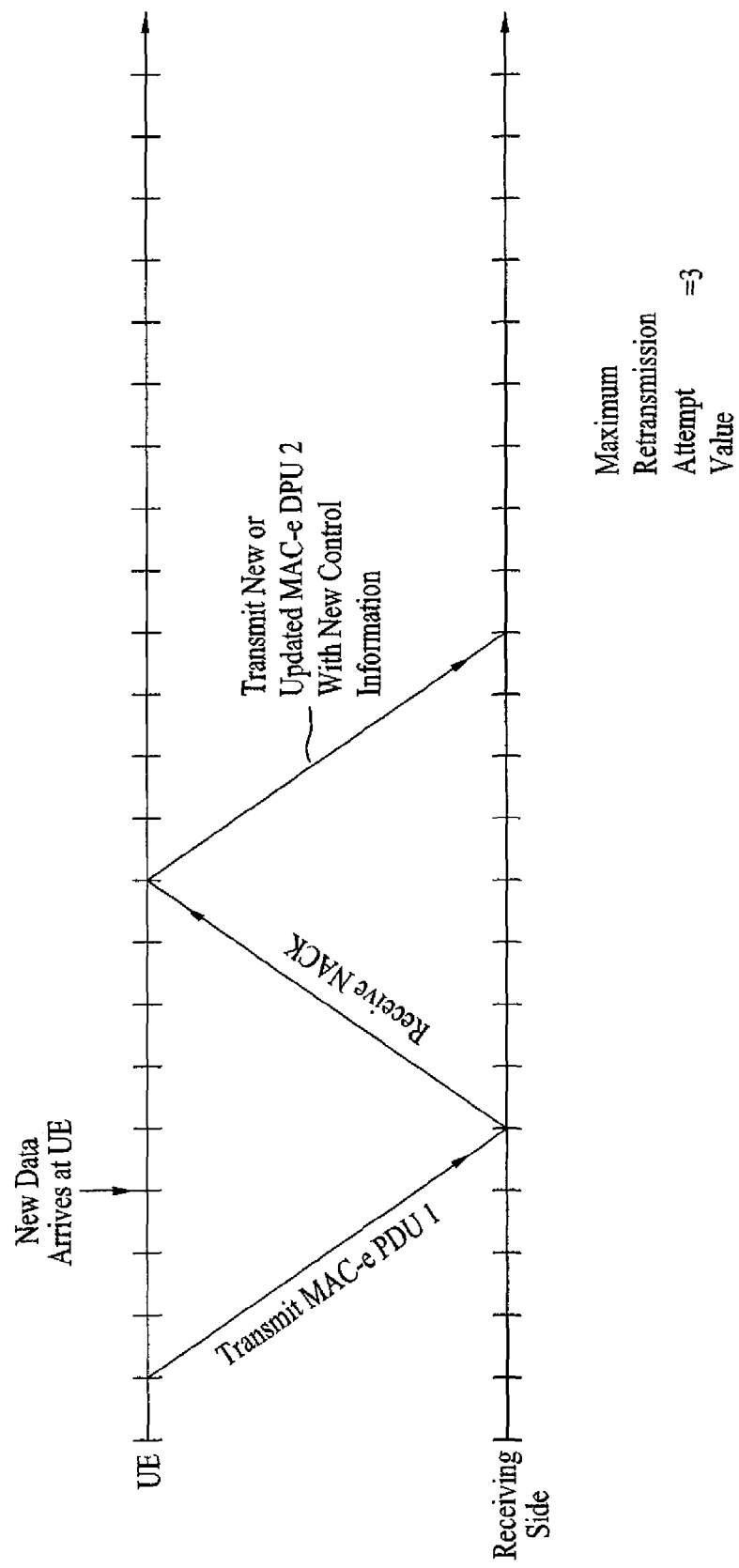
FIG. 6A illustrates a method for communicating control information in accordance with one embodiment of the present invention.

FIG. 6A illustrates a method for communicating control information in accordance with one embodiment of the present invention. Referring to FIG. 6A, a first data packet (MAC-e PDU 1) comprising first control information for first data is transmitted from a UE to a receiving side, wherein the receiving side may be a network or a mobile terminal, for example. Preferably, the first control information requests a resource allocation for the transmission of the first data. Subsequently, new data arrives at the UE to be transmitted to the receiving side. In order to transmit the new data, the UE requests a data transmission resource allocation from the receiving side by transmitting control information related to the new data (new control information) to the receiving side via a new or updated data packet (MAC-e PDU 2).

As shown in FIG. 6A, the UE preferably does not wait until receiving an ACK from the receiving side for the first data packet, or until the maximum number of first data packet retransmissions is attained prior to transmitting the new control information to the receiving side. Rather, the UE waits to receive a NACK for the first data packet. Upon receiving the NACK, the UE configures a new data packet or updates the first data packet to include the new control information. Thereafter, the new or updated data packet is transmitted to the receiving side.

Figure 6B:
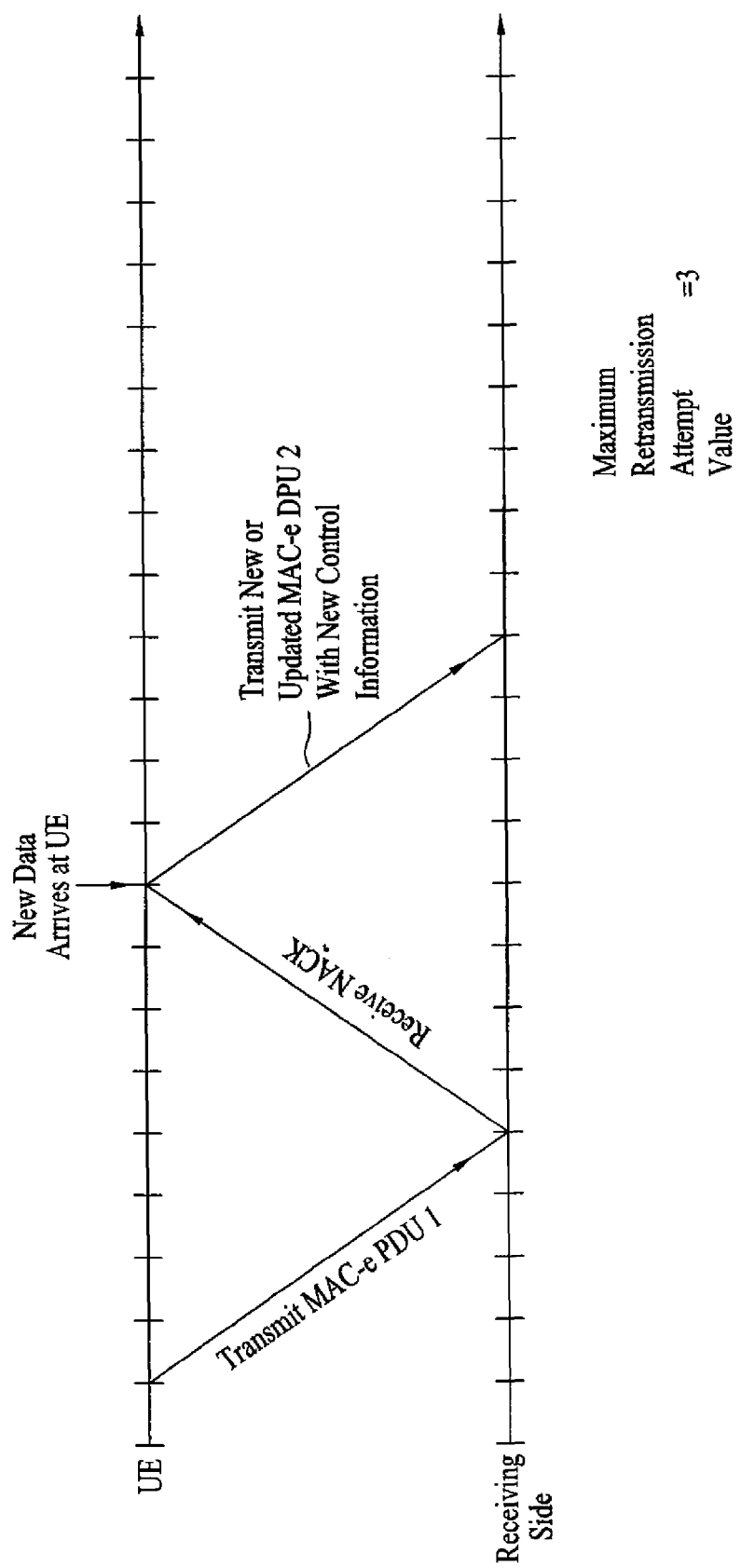
FIG. 6B illustrates a method for communicating control information in accordance with another embodiment of the present invention.

FIG. 6B illustrates a method for communicating control information in accordance with another embodiment of the present invention. As shown in FIG. 6B, new data to be transmitted arrives at the UE at a time when a NACK is received from a receiving side for a first data packet transmission. When the NACK is received, the UE configures a new data packet or updates the first data packet to include new control information related to the new data. Thereafter, the new or updated data packet is transmitted to the receiving side.

Figure 7:
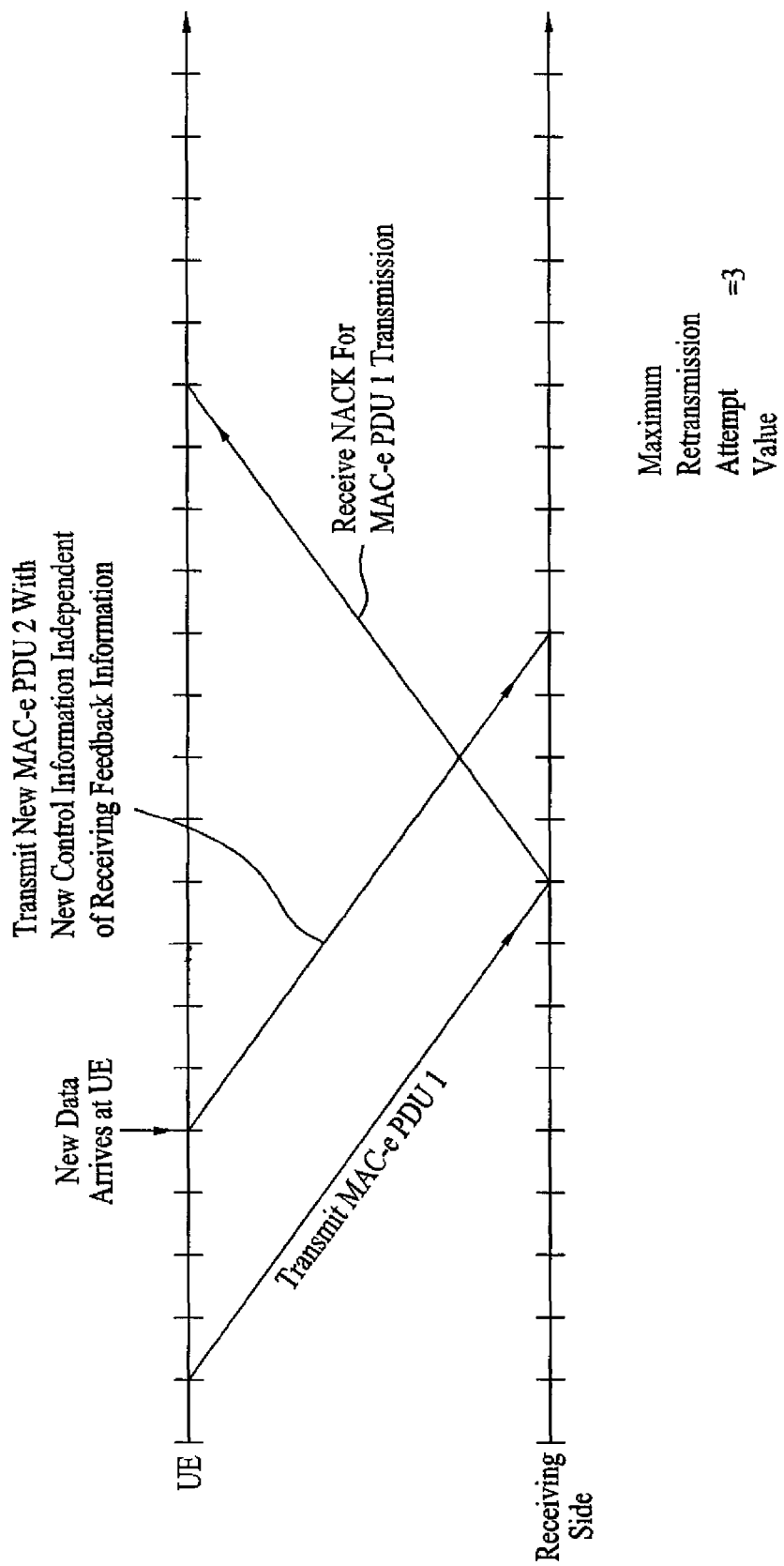
FIG. 7 illustrates a method for communicating control information in accordance with another embodiment of the present invention.

FIG. 7 illustrates a method for communicating control information in accordance with another embodiment of the present invention. Referring to FIG. 7, the UE does not wait to receive any feedback information from the receiving side for a previously-transmitted data packet prior to transmitting new control information. Thus, once new data arrives at the UE to be transmitted to the receiving side, the UE immediately configures a new data packet comprising new control information related to the new data for requesting a data transmission resource allocation. Once configured, the new data packet is transmitted to the receiving side independent of receiving feedback information for the previously-transmitted data packet.

Hence, the present invention enables a UE using E-DCH to receive a service of proper quality. For this, the present invention discloses a method of enabling a UE to transmit control information to a base station effectively. Preferably, if the contents of the control information to be transmitted are changed while a UE performs HARQ retransmission, new control information of the UE is transmitted to the Node B.

In accordance with one embodiment of the present invention, when a UE transmits a MAC-e PDU containing control information to a base station (Node B) and waits for a response (feedback information) from the base station for the MAC-e PDU, if the response instructs that the UE should retransmit the MAC-e PDU, the UE stops a retransmission of the MAC-e PDU, re-configures the MAC-e PDU with the latest control information to be transmitted, and transmits the re-configured MAC-e PDU. If control information is included in the MAC-e PDU only and if control information of the UE is changed while the UE receives the corresponding response, the UE stops a retransmission of the MAC-e PDU, re-configures the MAC-e PDU with the latest control information to be transmitted, and then transmits the re-configured MAC-e PDU.

In accordance with another embodiment of the present invention, the UE includes control information in a MAC-e PDU and transmits the MAC-e PDU to a base station. The UE then waits for a response (feedback information) from the base station for the MAC-e PDU. If the UE receives a command instructing the UE to retransmit the MAC-e PDU, and if the MAC-e PDU includes only the control information, and if the control information of the UE is changed while the UE having transmitted the MAC-e PDU receives a corresponding response, the UE can ignore a maximum number of retransmissions.

In accordance with another embodiment of the present invention, when a UE transmits a MAC-e PDU containing control information to a base station, if the MAC-e PDU includes only the control information, the present invention discloses that a maximum number of retransmissions of the MAC-e PDU is construed as zero. Preferably, the UE decides not to perform the retransmission when the MAC-e PDU includes only the control information. When receiving a response indicating that a reception of the MAC-e PDU including only the control information fails, the UE ignores the previous MAC-e PDU, configures a MAC-e PDU by updating the control information and transmits the configured MAC-e PDU. The UE attempts this process until receiving a response indicating a successful reception of the MAC-e PDU and continues performing this process until a number of retransmissions does not exceed a maximum number of retransmissions. Notably, if an initial MAC-e PDU transmission is included in the retransmission number in this process, the UE may construe the maximum number of retransmissions as 1.

Preferably, the control information described above comprises scheduling information such as a UE's marginal power quantity (mobile terminal power headroom), a total quantity of data possessed by the UE (total E-DCH buffer status), a channel having a highest priority among channels having data to be transmitted (highest priority logical channel identifier), or a ratio of data quantity corresponding to a channel having a highest priority over total data.

In accordance with another embodiment of the present invention, when the UE receives a response instructing that a retransmission is necessary after having transmitted a MAC-e PDU including only control information, and if data arrives at a channel having a priority higher than that of a channel having a highest priority instructed by the control information, the UE stops a retransmission of the MAC-e PDU, includes updated control information in a new MAC-e PDU and transmits the new MAC-e PDU to the base station.

Preferably, after the UE has transmitted the MAC-e PDU including the control information only, if the UE receives a response requesting a retransmission of the MAC-e PDU, and if the control information the UE is to transmit is to be updated, and if a number of retransmissions is smaller than a maximum number of retransmissions, the UE retransmits the previously transmitted MAC-e PDU. Otherwise, the UE stops the retransmission.

Preferably, the response requesting the retransmission comprises a signal indicating that a receiving side fails to receive data from a transmitting side correctly. A NACK signal is an example of such a signal. Preferably, if another user data is included in the UE-transmitting MAC-e PDU including the control information, the UE continues to perform the retransmission for the previous MAC-e PDU.

Preferably, if a channel status is poor, the UE preferably continues to transmit the previously transmitted MAC-e PDU for a more concrete reception at a Node B. For this, if the control information is changed for the MAC-e PDU containing the control information only, the UTRAN informs the UE whether to keep performing the retransmission of the previous MAC-e PDU or to configure and send a new MAC-e PDU with the latest control information. Accordingly, this may be accomplished utilizing a setup indicator.

Accordingly, the present invention enables new control information to be quickly transmitted to a base station in a mobile communication system utilizing an automatic repeat request scheme.

Figure 8:
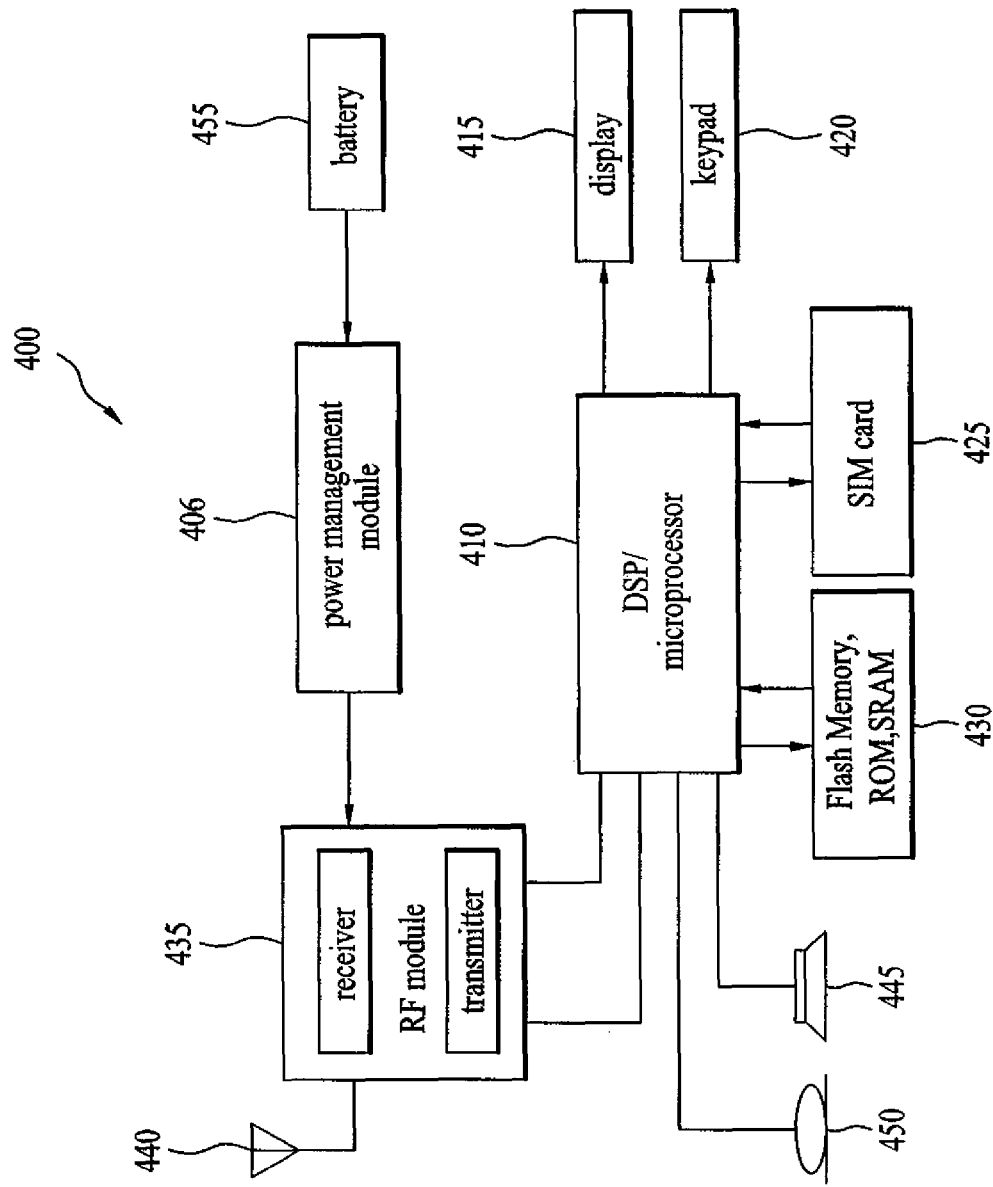
FIG. 8 illustrates a block diagram of a mobile communication device in accordance with one embodiment of the present invention.

Referring to FIG. 8, a block diagram of a mobile communication device 400 of the present invention is illustrated, for example a mobile phone for performing the methods of the present invention. The mobile communication device 400 includes a processing unit 410 such as a microprocessor or digital signal processor, an RF module 435, a power management module 406, an antenna 440, a battery 455, a display 415, a keypad 420, a storage unit 430 such as flash memory, ROM or SRAM, a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435 to initiate communication, for example, transmits radio signals comprising voice communication data. The RF module 435 comprises a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 445, for example.

The processing unit 410 is adapted to receive first and second data from an upper layer and generate a first and second data block comprising information related to the first and second data to be transmitted to a network. The processing unit 410 is also adapted to control a transmitter of the RF module 435 to transmit the first and second data block to the network. A receiver of the RF module 435 is adapted to receive signals from the network.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for communicating control information in a mobile communication system, the method comprising:
   transmitting a first medium access control packet data unit (MAC PDU) to a network using a hybrid automatic repeat request (HARQ) process, wherein the first MAC PDU comprises control information informing the network of information for an amount of resource needed by a user equipment;
   updating the control information to reflect a change of the control information at the user equipment and transmitting a second MAC PDU comprising the updated control information to the network, when the HARQ process for the transmission of the first MAC PDU is determined to be failed and the first MAC PDU further comprises data; and
   stopping a process related with the transmission of the first MAC PDU, when the HARQ process for the transmission of the first MAC PDU is determined to be failed and the first MAC PDU does not further comprise data.

2. The method of claim 1, further comprising:
   receiving a negative acknowledgement (NACK) from the network for the first MAC PDU, wherein the transmission of the second MAC PDU is triggered when the NACK for the first MAC PDU is received.

3. The method of claim 1, wherein the control information comprises scheduling information.

4. The method of claim 3, wherein the scheduling information comprises at least:
   a highest priority logical channel identifier,
   a total E-DCH buffer status,
   a highest priority logical channel buffer status, or
   a user equipment power headroom.

5. The method of claim 4, wherein the user equipment transmits the updated scheduling information reflecting the changed highest priority logical channel identifier with a priority higher than any other data transmission, when there is a change of the highest priority logical channel identifier.

6. The method of claim 4, wherein priority is related to a logical channel through which data is delivered.

7. The method of claim 1, wherein:
   the first MAC PDU further comprises the data; and
   the user equipment retransmits the data via the second MAC PDU.

8. The method of claim 1, wherein:
   the first MAC PDU comprises the control information only; and
   the user equipment does not retransmit the first MAC PDU and transmits the second MAC PDU.

9. A mobile terminal for communicating control information in a mobile communication system, the mobile terminal comprising:
   a processor for receiving user data from an upper layer, generating a first medium access control packet data unit (MAC PDU) to be transmitted, wherein the first MAC PDU comprises control information informing a network of information for an amount of resource needed by the mobile terminal, and updating the control information to reflect a change of the control information at the mobile terminal; and
   a transmitter controlled by the processor for transmitting the first MAC PDU to the network using a hybrid automatic repeat request (HARQ) process,
   wherein, when the HARQ process for a first MAC PDU comprising the control information and data is determined to be failed, the processor controls the transmitter to transmit a second MAC PDU comprising updated control information to the network, and
   wherein, when the HARQ process for a third MAC PDU comprising the control information without data is determined to be failed, the processor stops a process related with the transmission of the third MAC PDU.

10. The mobile terminal of claim 9, wherein the determination of the failed HARQ process for the transmission of the first MAC PDU is made by the processor when a negative acknowledgement (NACK) is received from the network for the first MAC PDU, and wherein the processor triggers the transmission of the second MAC PDU when the NACK for the first MAC PDU is received.

11. The mobile terminal of claim 9, wherein the control information comprises scheduling information.

12. The mobile terminal of claim 11, wherein the scheduling information comprises at least:
   a highest priority logical channel identifier,
   a total E-DCH buffer status,
   a highest priority logical channel buffer status, or
   a mobile terminal power headroom.

13. The mobile terminal of claim 12, wherein the processor controls the transmitter to transmit the updated scheduling information reflecting a changed highest priority logical channel identifier with a priority higher than any other data transmission, when there is a change of the highest priority logical channel identifier.

14. The mobile terminal of claim 12, wherein priority is related to a logical channel through which data is delivered.

15. The mobile terminal of claim 9, wherein:
   the first MAC PDU further comprises the data; and
   the processor controls the transmitter to retransmit the data via the second MAC PDU.

16. The mobile terminal of claim 9, wherein:
   the first MAC PDU comprises the control information only; and the processor controls the transmitter to not retransmit the first MAC PDU, and to transmit the second MAC PDU.

* * * * *